Oct. 25, 1966  R. J. KOERNER  3,280,781
AUTO-PILOT SYSTEM

Filed Sept. 27, 1965  5 Sheets-Sheet 1

INVENTOR.
RALPH J. KOERNER
BY
Allen M. Sutton
ATTORNEY

Oct. 25, 1966

R. J. KOERNER 3,280,781

AUTO-PILOT SYSTEM

Filed Sept. 27, 1965

INVENTOR.
RALPH J. KOERNER
BY
Allen M. Sutton
ATTORNEY

Oct. 25, 1966   R. J. KOERNER   3,280,781
AUTO-PILOT SYSTEM
Filed Sept. 27, 1965   5 Sheets-Sheet 3
Fig. 8
Fig. 9
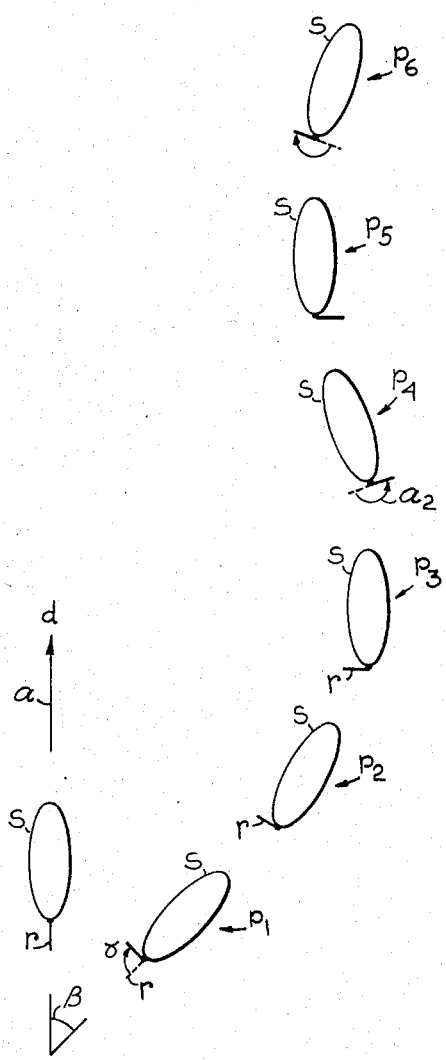
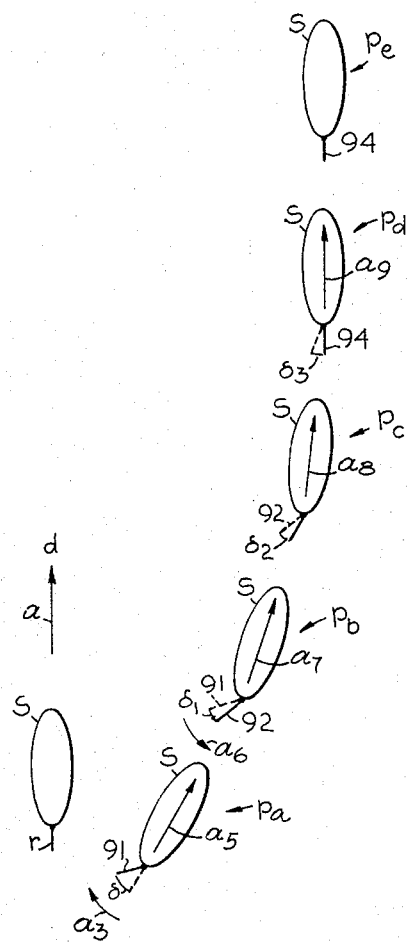
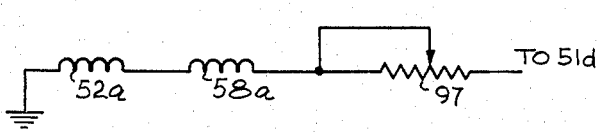
Fig. 10
INVENTOR.
RALPH J. KOERNER
BY
ATTORNEY Oct. 25, 1966  R. J. KOERNER  3,280,781
AUTO-PILOT SYSTEM Filed Sept. 27, 1965  5 Sheets-Sheet 4

INVENTOR.
RALPH J. KOERNER
BY

ATTORNEY

INVENTOR.
RALPH J. KOERNER
BY

ATTORNEY

United States Patent Office 3,280,781
Patented Oct. 25, 1966

3,280,781
AUTO-PILOT SYSTEM
Ralph J. Koerner, Canoga Park, Los Angeles, Calif., assignor to The Bunker-Ramo Corporation, Stamford, Conn., a corporation of Delaware
Filed Sept. 27, 1965, Ser. No. 494,300
36 Claims. (Cl. 114—144)

This application is a continuation-in-part of U.S. patent application Serial No. 334,348, filed on December 30, 1963 by Ralph J. Koerner.

The present invention relates to a system for automatically piloting a navigable body, and, more particularly, the invention is directed to a system wherein angular deviations of the heading of a navigable body from a predetermined direction are detected and used to automatically redirect the navigable body to the desired predetermined direction.

Although at present some auto-pilot systems are in existence for automatically piloting or directing a navigable body on a desired course of travel, and such systems seem to operate with varying degrees of success, most of them suffer from noticeable disadvantages which reduce their adaptability and accuracy of performance. In most known state-of-the-art auto-pilot systems adapted for marine applications, modified conventional compasses are used to automatically provide steering command signals whenever the direction of travel of the marine body deviates from a predetermined course. The steering command signals are usually supplied to servoing systems including complex electromechanical equipment to turn the rudder of the marine body in order to rotate the body to correct its direction of travel. In order to insure that the rudder is turned only by an amount necessary to rotate the marine body to the desired direction of travel so as to avoid hunting, feedback signals indicative of the rudder position are developed and utilized so that the steering command signals are a function of not only the amount of course deviation of the marine body, but are also a function of the instantaneous position of the body's rudder.

In most known systems, the feedback signals heretofore mentioned, and the full importance of which will hereinafter be explained in detail, are mechanically or electromechanically supplied to the modified conventional compasses for mechanically moving or rotating a portion of the compass. The mechanical feedback arrangements are generally complex and inflexible. For example, the signal feedback ratio of such a mechanical feedback arrangement cannot be easily varied without the use of complex gear systems, such signal feedback ratio variation being necessary in order to compensate for the different rates of turning of marine bodies in response to their rudder positions. In addition, before such an auto-pilot system can begin to automatically pilot the body, the body must first be manually piloted to the desired course of travel and the rudder positioned so that the ship may continue in that course, and only then can the auto-pilot system be engaged to subsequently automatically pilot the marine body.

In an exemplary state of the art system, the steering command signals are developed by a modified conventional compass employing photo electric techniques in conjunction with a transparent north-seeking compass card having an opaque region thereon. A movable sensing apparatus, which can comprise a conventional compass bowl, is positioned proximate to the compass card. The sensing apparatus includes a pair of lamps positioned adjacent one side of the card and a pair of photo-sensing devices such as photocells positioned adjacent the opposite side of the card. Each of the photo cells is respectively aligned with a different one of the pair of lamps. The opaque region of the card is wide enough so that in a quiescent condition the beams of light from the lamps to their respective photosensing devices are split by the opaque-transparent boundaries of the card. When the movable sensing apparatus rotates with respect to the north-seeking card due to external forces such as a change in direction of the marine body on which it is mounted, light of a complete unsplit beam from the first lamp illuminates its corresponding photosensing device, while the card's opaque region blocks light from the second lamp from illuminating its corresponding photosensing device. The illuminated photosensing device develops steering command signals which in turn are supplied to the servoing system to turn the rudder in a first direction. A feedback signal indicative of the rudder position is in turn supplied to the sensing apparatus to rotate it, including the lamps and the photosensing devices, in a first direction so that the light beams from the lamps are again split by the transparent-opaque boundaries of the card. This results in the steering command signals being cut off so that the rudder ceases turning in the first direction. As is well known in the art, the marine body will start turning, due to the position of the rudder, in a second direction, consequently rotating the sensing apparatus with respect to the card so that light from the second lamp will then illuminate its corresponding photosensing device to thereby develop steering command signals which act to turn the rudder in a second direction. A new feedback signal indicative of the new rudder position is supplied to the sensing apparatus which again causes it to rotate with respect to the card. By this process, once the rudder is rotated in a first direction so as to turn the marine body toward its desired direction of travel, the rudder is returned to its quiescent position through a series of incremental steps which are controlled by the rate at which the marine body rotates towards its original direction of travel.

Several characteristics of the exemplary state-of-the-art system are to be noted. First, before the system can begin to automatically pilot the marine body, it has to be manually piloted to the desired course of travel. Only after being so piloted and with the rudder in its quiescent position can the rudder be coupled, as by a clutching mechanism, to the servoing system and the rest of the auto-pilot system. Any instantaneous error in the direction of the marine body when the rudder is coupled to the auto-pilot system cannot be corrected for and becomes a part of the system. Secondly, inasmuch as physical movement of the sensing apparatus with respect to the north-seeking card is required in the automatic course correction process heretofore described, a mechanical, or at least electromechanical, feedback system must be provided to the sensing apparatus. Such a mechanical system usually uses shafts and other mechanical members which are relatively complex and which must be regularly maintained. Further, since marine bodies have different rates of turning a response to their rudder positions, it is apparent that different ratios of feedback signal to rudder position are required for different bodies. However, since the exemplary state-of-the-art system employs a mechanical feedback system, such different ratios can only be accomplished by including gearing arrangements in the feedback system which further increase the complexity of the feedback portion of the auto-pilot system.

In view of the aforementioned deficiencies of known auto-pilot systems, it is an object of the present invention to provide an auto-pilot system which does not suffer from those disadvantages and which is characterized by the use of a non-mechanical feedback link.

The present invention is based on automatically piloting a navigable body by producing output signals in directional error detecting circuitry which are used to automatically steer or direct the body on a desired direction of travel, the output signals being a function of both the instantaneous direction of the body with respect to the desired direction, and the instantaneous position of the rudder thereof.

In accordance with the invention, directional error detecting circuitry, which senses the earth's ambient magnetic field, is supported on a navigable body and is adapted to be positioned thereon so that when the body is on a desired course of travel, the directional error detecting circuitry senses a given component of the earth's magnetic field and provides a quiescent output signal, e.g., zero volt, corresponding thereto. However, once the body deviates from its set course, the directional error detecting circuitry senses a change in the detected component of the earth's magnetic field thereby providing a non-quiescent output signal corresponding thereto. The non-quiescent output signals developed have characteristics which are related to the degree of change in the sensed magnetic field which of course is related to the degree of directional deviation of the navigable body from its set course. The non-quiescent output signals are supplied to a servoing system which in turn controls the turning of the body's rudder. As the rudder turns in order to rotate the navigable body towards its desired direction of travel, an electrical feedback signal indicative of the instantaneous rudder position is developed and supplied to the directional error detecting circuitry. There, the electrical feedback signal produces a magnetic field which is combined or summed with the changed component of the earth's magnetic field sensed by the directional error detecting circuitry. The rudder will continue to turn and the electrical feedback signal indicative of the position thereof will continue to change until the magnetic field produced thereby when combined or summed with the sensed changed component of the earth's magnetic field produces an apparent magnetic field condition equal to the original unchanged field condition, which of course results in the quiescent output signal being provided thereby halting further turning of the rudder. The navigable body will tend to rotate towards the desired course as a function of the rudder position, and as this occurs, the rudder will return in a series of incremental turning steps reaching its quiescent position when the navigable body has substantially returned to its set course. Thus, the auto-pilot system by means of electrical feedback signals operates to establish and hold a rudder position which is continuously proportional to the angle of deviation of the navigable body from its desired course.

In a first embodiment of the invention, the directional error detecting circuitry employed comprises two magnetic field sensing devices such as single strip flux gate magnetometers. The magnetometers are positioned with their axes parallel to one another, and preferably are so mounted and balanced that their axes remain in a horizontal plane while they are rotatable about a vertical axis. Thus, the magnetometers sense the horizontal component of the earth's magnetic field. By rotating the magnetometers about a vertical axis, the value of the detected field strength may be set at zero or any other quiescent level for any desired course of travel of the ship, and any departure from that value indicates a directional error in the course of the ship.

The two magnetometers are respectively coupled to first and second amplifiers. A portion of the output from each amplifier is fed back to the magnetometer connected to the amplifier's input. The feedback paths are oppositely oriented so as a result of the feedback, the sensed magnetic field component is aided in one of the magnetometers and opposed in the other of the magnetometers. As a consequence, regeneration will occur in one of the amplifiers while degeneration will occur in the other amplifier. An opposite condition will of course result if the sensed magnetic field component is in an opposite direction. The use of magnetic field sensing devices, such as single strip flux gate magnetometers, as directional error indicators is described in U.S. patent application Serial No. 275,117 entitled "Electronic Directional Error Indicating System," filed April 23, 1963 by applicant, and assigned to the assignee of the present application.

The initial embodiment of the invention incorporates several valuable features which will be only briefly mentioned here, but whose significance will become more apparent hereinafter. First, since the directional error detecting circuitry employed does not have to be mechanically rotated with respect to a north-seeking card, but rather is adapted to be fixed with respect to the navigable body for any selected direction of travel, a source can be set into the auto-pilot system even before the navigable body has been manually steered to the proper course. Secondly, since the feedback signal indicative of rudder position used in the present invention is electrical rather than mechanical, it can be easily varied so as to attain the proper ratio feedback signal to rudder position previously explained. That is, simple signal varying devices, such as potentiometers, may be used instead of complex gearing which has to be employed in mechanical feedback arrangement used by known systems.

In a second embodiment of the invention, a single magnetometer is employed in a time shared mode. That is, the outputs from the two amplifiers are alternately fed back in an opposite sense to the single magnetometer. Thus during even time periods, for example, the first amplifier will be active providing a feedback tending to aid a sensed magnetic field component in a first direction. If a sufficient sensed magnetic field exists in the first direction, then regeneration will occur in the first amplifier thus energizing the relay connected thereto which functions, for example, to correct for a starboard error. During odd time periods, the second amplifier will be active tending to aid a sensed magnetic field component in a second direction. If a sufficient sensed magnetic field exists in the second direction, then regeneration will occur in the second amplifier to energize its relay to correct for a portside error.

The second embodiment includes the features of the first embodiment and in addition introduces a feature based on the recognition that the turning characteristics of each given craft vary as a function of speed since rudder effectiveness is a non-linear function of speed. Accordingly, in order to compensate for this variation, means are incorporated in the second embodiment for varying the rudder feedback ratio as a function of speed.

The third disclosed embodiment of the invention also employs only a single magnetometer. Means are provided for driving a jitter current through the magnetometer in alternate directions to thus simulate the effect of alternately swinging the magnetometer through a threshold angle comprised of a small angle in a first direction and a small angle in a second direction each with respect to the intended course. If the heading of the body is within the threshold angle, the amplifier connected to the magnetometer output will alternately regenerate and degenerate thus providing an alternating output signal. If a sufficient directional error exists in one direction, however, the amplifier will remain in regeneration providing, for example, a positive direct output signal. If a sufficient directional error exists in an opposite direction, the amplifier will remain degenerated and, for example, provide a negative direct output signal.

The third embodiment of the invention includes the features of the first and second embodiments and introduces some other significant features. More particularly, a variable delay means is provided for introducing a delay between the time a directional error is sensed and the time correction of the error is initiated. By incorporating the delay, spurious directional errors caused by factors such as wave motion are ignored unless their effect persists. Also, means are provided for selectively varying the magnitude of the alternating jitter current to thus vary the threshold angle. So long as the heading of the craft remains within this angle, no corrective action is initiated. In addition means are provided for automatically reducing the magnitude of the jitter current during the time the rudder is being turned to thus reduce the threshold angle and increase the sensitivity of the system during this period.

In a still further embodiment of the invention, it is recognized that once a correction operation has been initiated, it may be desirable that the response of the auto-pilot system be faster and more precise than under normal conditions when spurious effects are to be disregarded. Thus, whenever the rudder is not in a dead ahead condition (indicating that a correction operation is still in progress) both the alternating jitter current supplied to the magnetometer and the delay are reduced to substantially zero.

Although the following description will primarily refer to the navigable body in terms of a marine navigable body such as a ship and to the directional error detecting circuitry in terms of magnetometers, it should be apparent that such reference is made for explanatory purposes only and that navigable bodies other than marine bodies as well as equivalent circuitry may be substituted without departing from the teachings of the invention.

The significance of the electrical feedback signal in the auto-pilot system of the invention as well as other advantages of the teachings disclosed herein will become apparent from the following description, taken in conjunction with the accompanying drawings, in which:

FIG. 8 is a navigational diagram useful in understanding the present invention;

FIG. 9 is another navigational diagram useful in pointing out the novel features of the present invention;

FIG. 10 is a schematic diagram of another improvement incorporated in a preferred embodiment of the invention;

Figure 1:
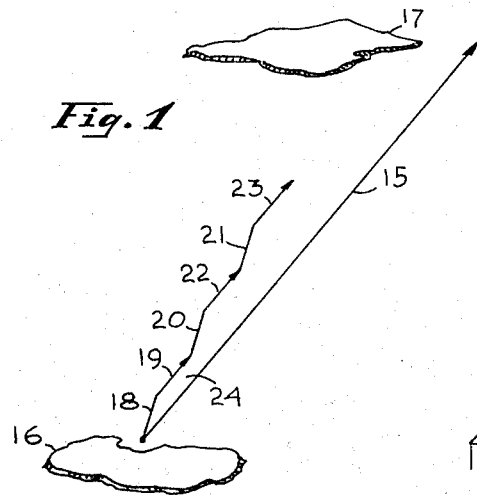
FIGURE 1 is a diagrammatic illustration of navigational problems that the present invention aids in solving.

In order to facilitate an understanding of the invention and some of the navigational problems the invention helps to solve, reference is made to FIG. 1 which diagrammatically illustrates a predetermined course of travel 15 from a body of land 16, the course being so chosen as to bypass another body of land 17. Through use of conventional direction indicators such as a compass, the navigator of a navigable body, such as a ship, after noticing a directional deviation 18 from the desired course, will generally return to a parallel course 19. Subsequent deviations 20 and 21 may be corrected by returning to parallel courses 22 and 23, respectively. However, such navigational corrections only maintain the navigated body on a line of travel parallel to its predetermined one, and do not account for shift in absolute position from the selected line of travel. With the present invention, however, since the direction deviations are automatically sensed, the system may be adjusted to respond to small directional deviations which are corrected in an extremely short time period so that the ship may be regarded as remaining on its true course of travel 15.

Figure 2:
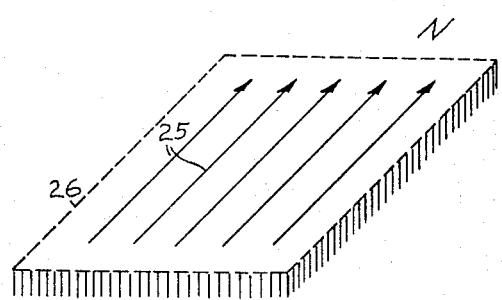
FIG. 2 is a diagrammatic illustration of the earth's ambient horizontal magnetic field in a plane parallel to a portion of the earth's surface.

As previously stated, the present invention incorporates magnetic field sensing devices capable of detecting component values of the earth's ambient horizontal magnetic field. In FIG. 2, lines 25 diagrammatically represent the earth's ambient horizontal magnetic field in a plane parallel to a portion of the earth's ambient surface 26. Although the lines all point towards the magnetic North Pole, they may be assumed to be substantially parallel over a relatively short distance.

Figure 3:
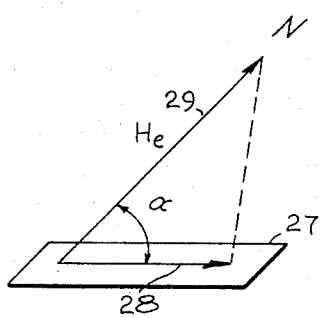
FIG. 3 is a diagrammatic illustration of the earth's ambient horizontal magnetic field as detected by a magnetic field sensing device positioned in a plane parallel to the earth's surface.

In FIG. 3, a magnetic field sensing device 27 similar to a flux gate magnetometer is illustrated as positioned with its long axis in a plane parallel to the earth's surface and forming an angle with respect to magnetic north. The vector component of the earth's horizontal magnetic field detected by the magnetic field sensing device is represented by line 28 and is equal to $H_e \cos(\alpha)$, $H_e$ being the earth's ambient horizontal magnetic field as denoted by line 29, and $\alpha$ being the angle between the axis of the magnetometer and the lines of force of the earth's magnetic field. Considering for a moment the expression $H_e \cos(\alpha)$, it is clear that when the angle $\alpha$ approaches ninety degrees, i.e., when the long axis of the magnetic field sensing device is substantially aligned in a west-east direction, the detected component of the earth's ambient horizontal magnetic field is minimal and becomes equal to zero when $\alpha$ equals ninety degrees.

Figure 4:
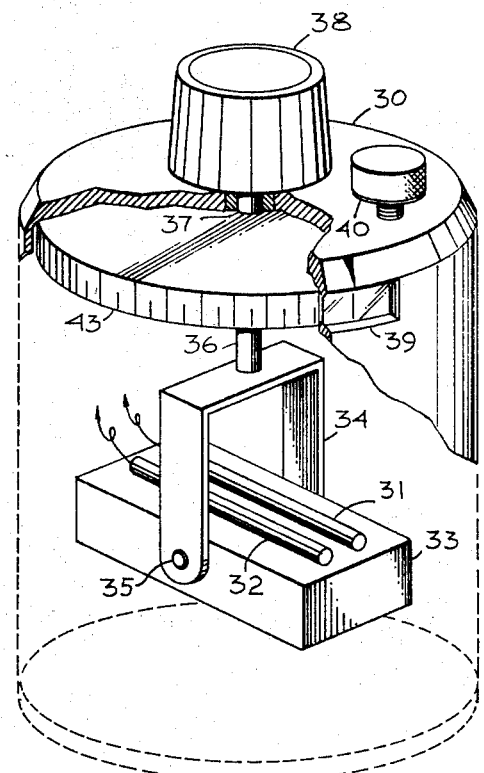
FIG. 4 is a perspective view of the mounting means for the magnetic field sensing devices.

FIG. 4 is a perspective view of the mounting means for the magnetic field sensing devices, with certain portions cut away for better viewing of the internal assembly. Within a housing 30, which is mounted in a navigational body such as a ship, two magnetic field sensing devices, such as magnetometers 31 and 32, are mounted on a platform 33. The platform 33 is pivotally mounted within a suspension bracket 34 for movement about a horizontal axis defined by pivot pins 35. The platform 33 is so mounted and balanced that it maintains the axes of the magnetometers in a horizontal plane. A shaft 36 is mounted for rotation within a sleeve 37, which forms an internal part of the housing. The shaft 36 is connected at one end to the top of the suspension bracket and has a positioning knob 38 attached to its other end. By turning the positioning knob, the long axes of magnetic field sensing devices 31 and 32 can always be fixed to be in the west-east direction for any predetermined direction of travel. A knurled screw 40 or other means may be used to lock the shaft 36, and the direction of travel may be read from a dial 43 through a window 39. As long as that direction of travel is maintained, the magnetic field sensing devices will remain aligned in the west-east direction.

As noted previously, the amplitude of the component of the earth's ambient horizontal magnetic field detected by the magnetic field sensing devices depends on the angular offset of the magnetic field sensing devices with respect to magnetic north (see FIG. 3). It can, therefore, be stated that the magnetic field sensing devices 31 and 32 will detect components of the earth's ambient horizontal magnetic field, the amplitude of the detected magnetic field being directly related to the angular offset or directional deviation of the navigable body from its predetermined direction of travel.

Figure 5:
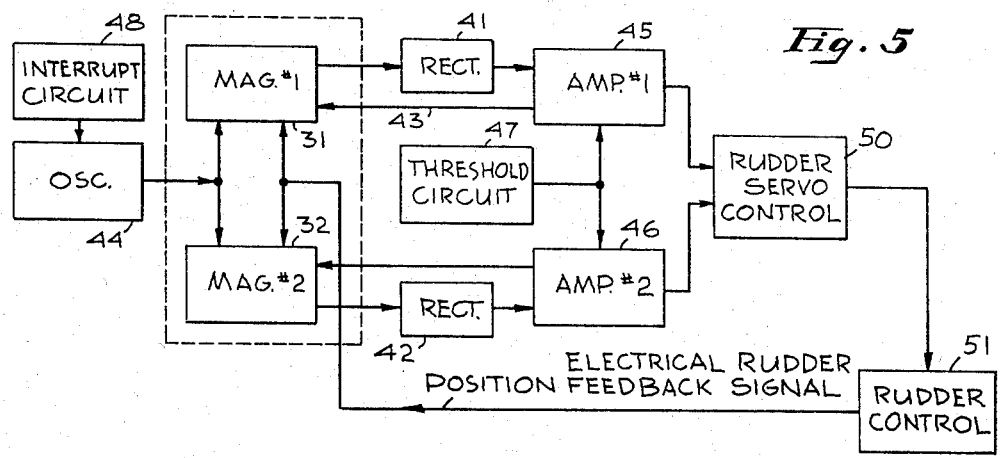
FIG. 5 is a block diagram of a system embodying the present invention.

The novel features of the present invention can better be understood by reference to FIG. 5, which is a highly simplified block diagram of apparatus embodying the invention. As there shown, an electrical oscillator 44 energizes magnetic field sensing devices, such as flux gate magnetometers 31 and 32. Basically each magnetometer comprises an element which is sensitive to the strength or variations in the strength of magnetic fields in conjunction with an arrangement for detecting and amplifying indications provided by the element.

Each of the flux gate magnetometers 31 and 32 may utilize a strip of high permeability, magnetically saturable material as the core of the sensing element, a pair of oppositely-wound input windings each associated with a portion of the strip core and connected in series with the alternating-current signal oscillator 44 for driving the strip to provide detectable conditions therein responsive to ambient magnetic fields. There are also a pair of output windings associated with the strip for detecting the aforementioned fields, and at least one feedback winding whose function will be explained hereafter.

The alternating-current input signal from oscillator 44 applied to the input windings yields an excitation field of such magnitude that the segments of the strip which are directly under the input windings are driven to magnetic saturation over a major portion of each half cycle. The sense of the input windings is such that the excitation field applied to the strip segment under one winding is equal in magnitude and opposite in sense to the excitation field applied to the strip segment which lies under the other input winding. The output windings are closely coupled to the input windings and are connected in series-aiding relationship to be individually responsive to the rate of change of the instantaneous flux in the associated strip segment. In the absence of an externally applied field, the net effect at the output windings is zero, and no output signal will result. However, when an external magnetic field of essentially constant magnitude and sense with respect to the period of one excitation cycle is applied to the strip, the strip segment under an input winding will be saturated for a longer period of time during that half cycle where the excitation field is in the same sense as that of the external field, and for a shorter period of time when the excitation field is in the opposite sense to the external field. Consequently, the previously existing symmetrical relationship between the flux in the respective portions of the strip is destroyed and as a result a net voltage is induced in the serially connected output windings. The voltage thus induced is a time-varying signal having a fundamental frequency which is twice the excitation frequency and varying in amplitude in proportion to the magnitude of the external magnetic field within the range of measurement of the magnetometer. Other magnetic field sensing devices capable of detecting the horizontal components of the earth's magnetic field may be used in practicing the present invention, the above description of flux gate magnetometers being presented for exemplary purposes only.

As previously described, both magnetometers are aligned to be parallel to one another and their long axes positioned in the west-east direction with respect to magnetic north for a particular predetermined direction of travel. The magnetometer 31 is connected through rectifier means 41 to an amplifier 45 with part of the output of the amplifier being fed back through an interconnecting line 43 as bias to the output windings of the magnetometer 31. The magnetometer 32 is similarly coupled through rectifier means 42 to an amplifier 46 with part of its output being fed back through an interconnecting line 47 as bias to the output windings of the magnetometer 32. The output windings of the two magnetometers are wound with opposing winding polarities so that for a given direction of angular offset of the magnetometers from the west-east alignment, the feedback bias applied to one magnetometer is regenerative, making the apparent magnitude of the detected magnetic field seem greater than it actually is. Thus, that magnetometer saturates and delivers maximum output signal, while, at the other magnetometer, the feedback bias is degenerative, reducing the output signal to substantially zero. For an angular offset opposite in direction to the above described deviation, regeneration will occur in the previously degenerative circuit, while the output signal of the previously saturated circuit will substantially reach zero.

The system of the present invention shown in FIG. 5 also includes a threshold circuit 47 which controls the threshold sensitivity levels of both amplifiers 45 and 46, thereby controlling the minimum angular offset necessary to energize the amplifiers. The system also includes an interrupt circuit 48 which serves to control the operation of the oscillator 44 by interrupting the alternating current supplied therefrom to the magnetometers 31 and 32 at a predetermined rate. The need for interrupting the alternating current supplied to the magnetometers becomes apparent when considering the saturated operation of either of the amplifiers 45 and 46 which, unless briefly interrupted, may remain saturated even though its respective magnetometer may no longer sense any horizontal component of the earth's magnetic field.

As seen from FIG. 5, both outputs of the amplifiers 45 and 46 are connected to a rudder servo control 50 which responds to the saturated output of either amplifier, depending on the direction of the angular deviation of the navigable body from the desired course of travel. The rudder servo control 50 produces a corresponding servo signal which is supplied to a rudder control 51, so that the rudder thereof is turned, in order to automatically turn the ship so as to redirect it to the desired course of travel. The rudder may be defined as the means for controlling the direction or course of travel of a navigable body. From experience, it is known that there is an inherent lag between the time the rudder is turned to any position and the actual time the ship starts turning. Therefore, means have to be provided to control the degree of positioning of the rudder so that the ship may catch up and align itself as desired. For example, let us assume that a ship has suddenly deviated from a desired course of travel, and that the rudder was first caused to turn so as to turn the ship back toward the desired course. However, since the rudder turns in a relatively short period of time in comparison with the time required for the ship to turn, it is clear that unless means are provided to stop the rudder from turning beyond an amount necessary, it will continue to turn, so that the ship will not only return to the desired course but will overshoot it in the opposite direction, resulting in a new sensed directional deviation which will in turn cause the rudder to redirect the ship. Such phenomenon is known as directional hunting and is most undesirable.

According to the teachings of the present invention, such phenomenon is eliminated by producing an electrical rudder position feedback signal which is a function of the rudder position, and supplying it to the feedback windings of the magnetometers 31 and 32 (see FIG. 5). The function of the feedback signal is to be effectively combined with the earth's magnetic field detected by the magnetometers so that the resultant output signal of the saturated magnetometer is substantially reduced to zero, thereby deenergizing the respective amplifier and in turn deenergizing the rudder servo control 50 so that the rudder stops from turning.

Figure 6:
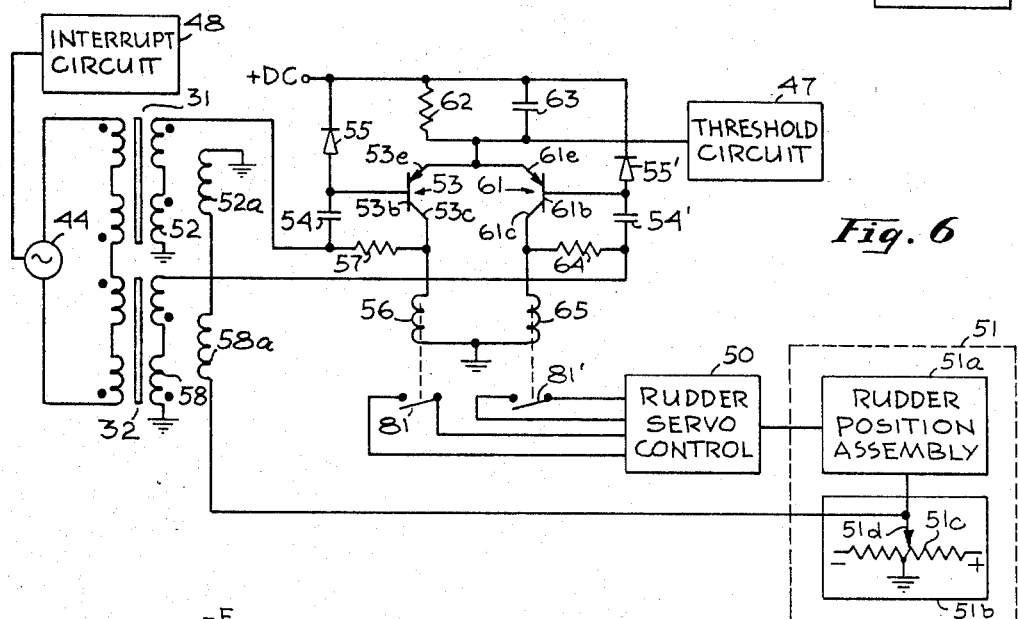
FIG. 6 is a combination schematic and block diagram of the system shown in FIG. 5.

For a more complete description of the invention, reference is now made to FIG. 6, wherein the magnetometers 31 and 32 are shown as being energized by the electrical oscillator 44. Output windings 52 of the magnetometer 31 are connected through a capacitor 54 to the base 53b of a PNP type of transistor-amplifier 53. The base 53b is also connected to a source of positive potential (not shown) through a diode 55, the capacitor 54 and diode 55 acting to rectify the input to the transistor 53. The output voltage of transistor-amplifier 53 is taken from its collector 53c which is returned to ground potential through a relay coil 56. Part of the output voltage at the collector is fed back to the output windings of magnetometer 31 through a feedback resistor 57. The output windings 58 of magnetometer 32 are similarly connected to the base 61b of a PNP type of transistor-amplifier 61 through a capacitor 54'; a diode 55' connects the base to the positive potential source. The capacitor 54' and diode 55' act to rectify the input to the transistor 61. The collector 61c of the transistor-amplifier 61 is connnected to the output windings of the magnetometer 32 through a feedback resistor 64 and to ground potential through a relay coil 65. The emitters 53e and 61e of both transistor-amplifiers 53 and 61 are connected to the positive potential source through a parallel combination of a resistor 62 and a capacitor 63. The polarities of voltages appearing across the primary and secondary windings of the magnetometers 31 and 32 are indicated in conventional manner by means of dots.

Figure 7:
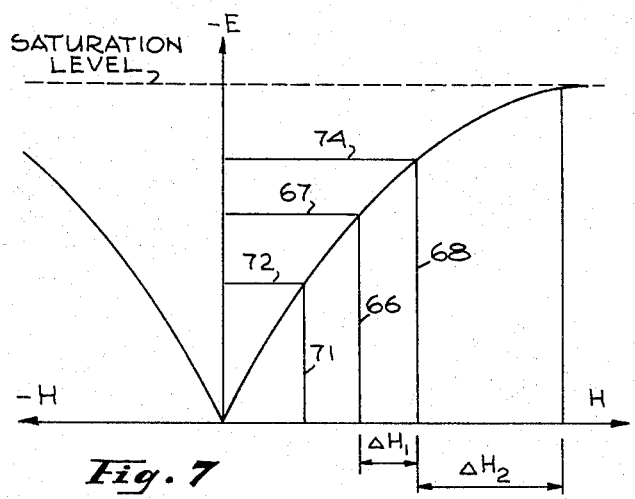
FIG. 7 is a graphical illustration of the response curve of a magnetic field sensing device wherein the output signal is plotted as a function of applied magnetic field values.

According to the present invention, for any given angular offset or directional deviation of the navigable body from the predetermined course of travel, either transistor-amplifier 53 or transistor-amplifier 61 will have an output signal of sufficient amplitude to energize one of the relay coils 56 or 65. This occurs because of the magnetometer-amplifier regeneration principle previously mentioned, and which can be better understood by referring to FIG. 7 wherein the rectified ouput of either magnetometer is plotted as a function of detected magnetic field intensity. Assume, for explanatory purposes, that both magnetometers have detected a component of the earth's ambient horizontal magnetic field of a positive polarity and amplitude as denoted by a line 66. Both magnetometers, therefore, will have initial output signals of amplitude indicated by a line 67, which will be amplified by their respective transistor-amplifiers and parts of the amplified signals will be fed back as biasing currents to each magnetometer. The effect of the biasing currents will differ in each magnetometer since the output windings of the two magnetometers are wound with opposite polarities with respect to one another. Therefore, the biasing current in one magnetometer will tend to establish an apparent magnetic field in a direction which is additive to the detected component of the earth's ambient horizontal magnetic field, resulting in an apparent higher value of magnetic field intensity, as at 68, and an apparent higher output signal level, as at 74. The output signal in turn will be amplified and further bias the magnetometer's output windings to increase the apparent magnetic field intensity until the output of the magnetometer reaches a saturation level. However, in the other magnetometer, the biasing current due to the reversed winding polarity will tend to establish an apparent magnetic field in a direction which is subtractive to the detected component of the earth's ambient horizontal magnetic field, thus resulting in an apparent lower value of magnetic field intensity, as at 71, and a lower output signal level, as at 72. This in turn will be amplified and further bias the magnetometer windings to further decrease the apparent magnetic field intensity until the output of this magnetometer will reach zero. With a sufficiently large feedback ratio, the magnetometer-amplifier loop gain is infinite and the circuit is bistable. By incorporating this circuit in the present invention, a system is provided wherein it is possible for a very small angular offset to cause the appropriate magnetometer-amplifier circuit loop to regenerate and "lock up" in saturation. This energizes the corresponding relay coil, which in turn causes an open contact associated therewith to be closed. For example, if magnetometer 31–amplifier 53 are in saturation, the relay 56 is energized, closing normally open contact 81 (FIG. 6).

For an angular offset opposite in direction from the foregoing example, both magnetometers will detect components of the earth's ambient horizontal magnetic field which appear to be opposite in polarity from those previously assumed. However, the previously degenerative magnetometer-amplifier loop will now be in a regenerative state, thereby reaching the saturation level and energizing its associated relay coil so as to cause its associated contact to close. For example, the saturation of magnetometer 32 and amplifier 61 will energize relay coil 65 which in turn will cause a normally open contact 81' to close.

A system embodying the invention may further include a threshold circuit 47 shown in FIG. 6 in block diagram as being connected to the junction point of the emitters of the transistor-amplifiers 53 and 61. By adjusting the output level of the threshold circuit 47, it is possible to control the direct-current (D.C.) bias level of the emitters 53e and 61e of the transistor-amplifiers 53, 61. This determines the minimum output signals from the magnetometers which are necessary to forwardly bias the emitter-base junctions of transistors 53 and 61, so that the previously described regeneration-degeneration action may occur. Therefore, it is seen that by manually adjusting the output level of the threshold circuit 47, it is possible to control the minimum detectable angular offset which will energize the control circuit. The threshold circuit may comprise known circuits which are adapted to an adjustable output level.

From the foregoing description, it is apparent that as the navigable body deviates in a first direction from the desired course of travel, one of the magnetometer-amplifier arrangements shown in FIG. 6 becomes saturated, so that its associated relay coil is energized and in turn the contact of the relay closes. If the navigable body deviates from the desired course of travel in a direction opposite to the first direction, the other magnetometer-amplifier arrangement becomes saturated and the other relay coil is energized, resulting in the closing of the contact thereof.

As seen from FIG. 6, the contacts 81 and 81' associated with the relay coils 56 and 65, respectively, are connected to the rudder servo control 50, so that when either contact closes the rudder servo control is energized and in turn produces a servo output signal which is supplied to the rudder control 51 for turning the rudder of the ship by means of a rudder position assembly 51a which is a part of the rudder control 51 (FIG. 5). If contacts 81 close, the rudder is turned in a first direction such as, for example, clockwise so that the ship may adjust its course of travel in a counterclockwise sense, while if contacts 81' close the rudder is turned in a counterclockwise sense so that the ship may adjust its course of travel by turning clockwise.

Although such an auto-pilot system may perform with varying degrees of success, the teachings of the present invention further disclose rudder position feedback circuitry 51b (see FIG. 6) which is coupled to the rudder position assembly 51a. The rudder position feedback circuitry 51b as shown in FIG. 6 comprises a resistor 51c which is center tapped to ground potential with the ends thereof being connected to positive and negative potential sources (not shown). The rudder position assembly 51a is connected to a movable arm 51d of the resistor 51c so that the potential value at the arm is a function of the position of the rudder. For example, if the rudder of the ship turns in one direction, the movable arm 51d may be moved along the part of the resistor between ground potential and the positive potential source, whereas if the rudder is turned in an opposite direction, the movable arm 51d may be moved along the part of the resistor between the ground potential and the negative potential source. It is clear, therefore, that the potential value at the movable arm 51d is a function of the position of the rudder, such potential varying between negative and positive potential values with respect to ground potential.

As seen in FIG. 6, the movable arm 51d is connected to ground potential through serially connected windings 52a and 58a. The windings 52a and 58a are in a sense third windings of the magnetometers 31 and 32, respectively and may be thought of as feedback windings which impress magnetic fields in their respective magnetometers which are proportional to the electrical current flowing therethrough. From FIG. 6, it is apparent that unless the movable arm 51d is positioned at the grounded center tap of the resistor 51c, a potential difference will exist across the windings 52a and 58a, resulting in a biasing current flowing therethrough, the direction of current flow depending on whether the potential difference across the windings 52a and 58a is positive or negative with respect to ground potential. In turn, the polarity of the magnetic fields impressed on the magnetometers due to the current flow in the windings 52a and 58a will depend on the direction of the flow of current therein.

The importance of the signal feedback arrangement from the rudder to the magnetometers may best be appreciated and explained in connection with FIG. 8 which diagrammatically represents navigational problems which may arise when navigating a ship with an auto-pilot system which does not include the current feedback arrangement. Let us assume that a ship $s$ (FIG. 8) having a rudder $r$, is heading in a desired direction $d$ as indicated by an arrow $a$. Let us further assume that at some time the ship $s$ is off course, having deviated due to uncontrolled phenomena by an angle $\beta$ to the right of the desired direction of travel, the ship being at a position $p_1$. From the foregoing description of the schematic and block diagram of FIG. 6, it is apparent that one of the magnetometer-amplifier arrangements shown therein will become saturated so that one of the contacts, such as 81 or 81', will close. Assuming that contact 81 closes (i.e. the magnetometer 31 and amplifier 53 are saturated), the rudder servo control 50 will be energized and in turn will turn the rudder $r$ in a clockwise direction (to the left) in order to bring the ship back to the direction $d$, by turning it counterclockwise. However, since the ship does not instantly respond to the rudder position, the ship will continue to move in the off course direction for a while. But, as long as this occurs, the contact 81 will remain closed which in turn will result in the rudder being turned further to the left until it may reach a maximum angle of rotation, as indicated by the letter $\gamma$. The ship $s$ will move forward and due to the rudder position being in its maximum position of rotation, the ship will also tend to turn counterclockwise with respect to the previous position $p_1$, as indicated by position $p_2$. At some later time, the ship would have sufficiently turned to return the ship to its desired direction $d$ as indicated by the ship's position $p_3$; however, at such time the rudder is still turned left to the maximum degree, resulting in the ship overshooting the desired course $d$ and continuing to turn counterclockwise as indicated by position $p_4$.

As seen from FIG. 8, the ship at position $p_4$ is headed to the left of the course of travel $d$, so that the magnetometer 32 and amplifier 61 (FIG. 6) will now become saturated, causing contacts 81' to close which in turn will result in the rudder $r$ turning from the maximum clockwise rotational position to a counterclockwise rotational position, the rotation of the rudder being shown in FIG. 8 by an arrow $a_2$ the direction of rotation of the rudder being indicated by the arrow head. Again the ship $s$ will continue to travel forward and at the same time start turning clockwise, i.e., return to the desired course of travel, which is accomplished at a position $p_5$. But again the ship will not remain on the desired course but, rather, will continue to turn clockwise because of the rudder being at the maximum counterclockwise position, resulting in the ship deviating again to the right of the desired course, as indicated at a position $p_6$. From the foregoing description, it is apparent that an auto-pilot system which does not include a feedback signal will cause the ship to return to a desired course of travel; however, will not maintain it there, but rather will cause the ship to crisscross the course of travel, automatically attempting to hunt or reach the course of travel but always overshooting it in both directions.

However, the present invention includes an electrical rudder position feedback signal which overcomes the navigational disadvantages previously described so that the auto-pilot system taught herein is capable of accurately and smoothly returning an automatically navigated ship to a desired course of travel. Reference is now made to FIG. 9 wherein the ship $s$ described in connection with FIG. 8 is shown in a position $p_a$ similar to the position $p_1$ of FIG. 8. In position $p_a$, the rudder $r$ turns clockwise (to the left) in a manner similar to that described in connection with FIG. 8. However, whereas in the absence of a feedback signal the rudder turned to the maximum clockwise position as indicated by the angle $\gamma$, in the present arrangement, as the rudder starts turning clockwise as indicated by an arrowhead $a_3$ (FIG. 9), a proportional feedback signal is supplied to the magnetometers 31 and 32 via their feedback windings 52a and 58a from the rudder position feedback circuitry 51b (FIG. 6), the feedback signal being proportional to the rotated position of the rudder, as previously explained. As the rudder continues to turn, the magnitude of the current feedback signal increases until at some point the feedback biases the informative output signal of the particular magnetometer which indicates a deviation of the navigable body to the right of the desired course (magnetometer 31), so that the output thereof is insufficient to cause its associated amplifier (amplifier 53) to be regenerative. As a result, the contacts which were closed (contacts 81), now open, and the rudder stops from turning. Let us assume that the ship $s$ at the position $p_a$ had its rudder turned by an angle $\delta$ at which time the feedback signal from the rudder position feedback signal was sufficient to reduce the informative output signal of the magnetometer 31 below the threshold level of the circuit 47. As a result, the contacts 81 will be open.

In light of the foregoing description, it is seen that the feedback signals supplied to the magnetometers in a sense cause a new direction indicated by an arrow $a_5$ to be the apparent desired direction, since at position $p_a$, the ship $s$ points in this direction and yet neither magnetometer is saturated. The ship will continue to travel forward; however, due to the new rudder position as indicated by numeral 91, the ship will also tend to turn to the left of the apparent desired course indicated by the arrow $a_5$. After so turning to the left, the ship $s$ will reach a position $p_b$ and since such a position is to the left of the apparent desired course of travel (indicated by the arrow $a_5$), the magnetometer 32 and the amplifier 61 (FIG. 6) will become saturated, closing contacts 81' so that the rudder is turned counterclockwise, namely, to the right. But, as the rudder starts turning to the right as indicated by an arrowhead $a_6$, the feedback bias applied to both magnetometers decreases so that after turning counterclockwise by an angle $\delta_1$ to a position indicated by a numeral 92, the combined effect of the feedback and the informative output signal from the magnetometer 32 is below the level necessary to saturate the amplifier 61, resulting in contacts 81' opening up, which in turn stops the rudder from continuing to rotate in a counterclockwise direction. Since both contacts 81 and 81' are open at this instant of time, it is apparent that the new apparent desired direction of travel of the ship $s$ at the position $p_b$ is the one indicated by an arrow $a_7$. The ship will continue to move forward as well as to turn left (counterclockwise) during this phase of automatic course adjustments as indicated by a new ship position $p_c$. At this position, the rudder will further turn counterclockwise by an angle $\delta_2$ since at position $p_c$ the ship heading in a direction indicated by an arrow $a_8$ is to the left of the last apparent desired direction of travel indicated by the arrow $a_7$. The direction indicated by the arrow $a_8$ will now become the new apparent desired course of travel with the ship continuing to turn left (counterclockwise) as well as moving forward. Finally, at some position such as a position indicated by letters $p_d$ the ship will be headed in a direction indicated by an arrow $a_9$, this direction being substantially the same as the actual desired course of travel $d$ indicated by the arrow $a$. However, since the direction indicated by the arrow $a_9$ is to the left of the last apparent direction indicated by the arrow $a_8$, the rudder will still turn by an angle $\delta_3$, which in effect will return the rudder to its original position with respect to the longitudinal axis of the ship from stem to stern. With the rudder returned to its original position as indicated by a numeral 94, the ship will not turn counterclockwise (to the left) any longer since the new rudder position at the position 94 tends to direct the ship only in the direction indicated by the arrow $a_9$. The ship, therefore, will continue to travel forward in the direction of the arrow $a_9$ as indicated by the ship's position at a later position $p_e$. Since the rudder is now in its original position, it is apparent from FIG. 6 that the movable arm 51$d$ of the rudder position feedback circuitry 51$b$ is positioned at the grounded center tap of the resistor 51$c$ so that no potential difference is impressed across the feedback windings 52$a$ and 58$a$, resulting in zero electrical feedback supplied thereto. Such lack of feedback signal is an indication that the automatically piloted ship $s$ is on the preselected course of travel $d$.

From the foregoing description, it now becomes apparent that the auto-pilot system including the described signal feedback circuitry operates to automatically pilot a navigable body to a desired direction of travel from which the navigable body has been offset, such piloting being accomplished without the disadvantageous direction hunting described hereinbefore. Further, it is seen the the interconnection between the rudder position feedback circuitry 51$b$ and the magnetometers is relatively simple necessitating only electrical wiring rather than complex mechanical couplings including cumbersome gear arrangements which are used in some presently known systems.

The simplicity of the wiring feedback arrangement is particularly important when considering the fact that since ships have different rates of turning response as a function of the positions of their rudders, the ratio of feedback signal to rudder position is a variable depending on the particular ship which the system has to automatically pilot. The wiring feedback arrangement hereinbefore described is very adaptable to such feedback ratio variations. For example, an adjustable feedback ratio potentiometer 97, as shown in FIG. 10, may be incorporated between the movable arm 51$d$ and the feedback windings 52$a$ and 58$a$. By manually adjusting the potentiometer, more or less resistance may be introduced in the feedback circuit, thereby varying the ratio of feedback signal to rudder position. Once the feedback ratio is adjusted in a system for automatically piloting a particular ship, it need not be changed thereafter. It is apparent that such simplified feedback ratio adjustment which is most advantageous cannot be easily attained with mechanical feedback systems where changes in feedback ratios involve the changing of complex mechanical gearing couplings.

Although the rudder position feedback circuitry 51$b$ is shown as comprising a resistor 51$c$, it is apparent that other arrangements may be used to produce an electrical feedback signal whose amplitude and polarity are functions of the degree and direction of rotation or turning of the rudder of the ship to be automatically piloted, all such arrangements being within the contemplation of the invention. If a resistor arrangement as shown in FIG. 6 is chosen, it should be noted that the resistor selected should preferably be wound as a cosine function, since the detected horizontal component of the earth's magnetic field is a function of the cosine of the angle of deviation rather than a strictly linear relationship. However, if only small angular offsets from the desired direction of travel are anticipated, a linearly wound resistor is satisfactory since the cosine of small angles substantially equals unity.

Figure 11:
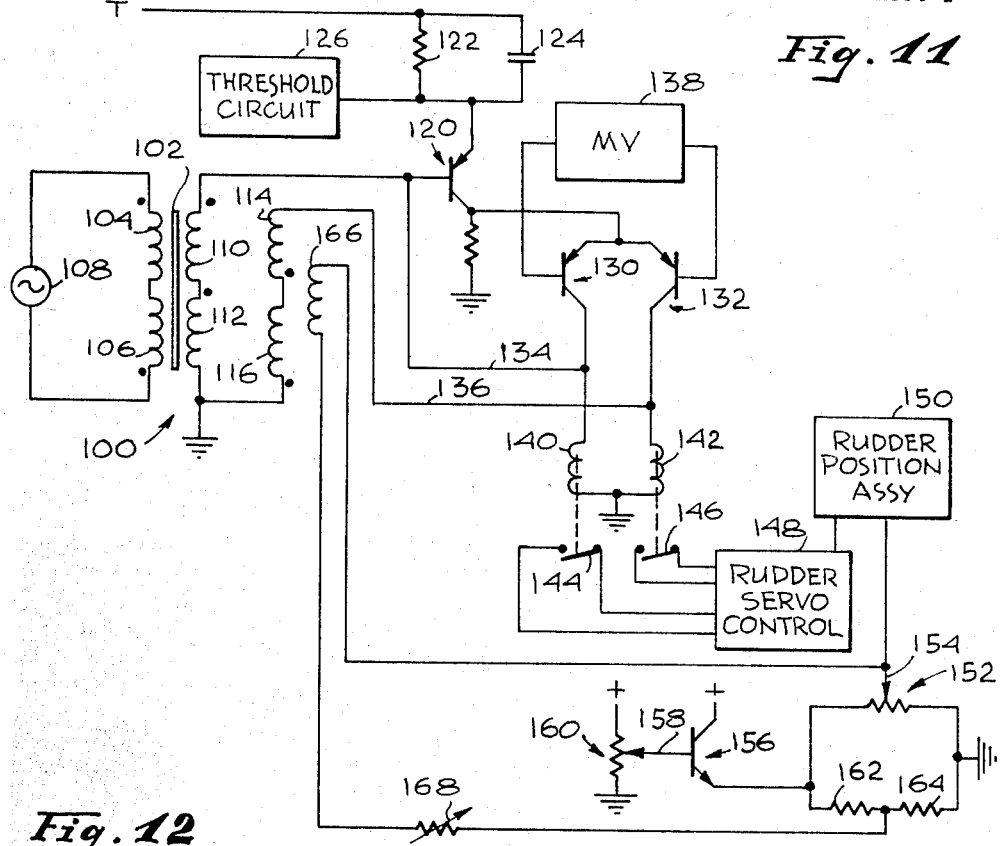
FIG. 11 is a schematic and block diagram of a second embodiment of the invention.

Attention is now called to FIG. 11 which illustrates a second embodiment of the invention which is similar to the embodiment of FIG. 6 except, however, that a single magnetometer is employed in a time-shared mode rather than a pair of magnetometers as is illustrated in FIG. 6. More particularly, the embodiment of FIG. 11 includes a magnetometer 100 having a core 102 on which is wound a pair of primary windings 104 and 106 energized by an oscillator 108. As previously described, the windings 104 and 106 are oppositely wound. A first set of secondary windings comprised of windings 110 and 112 are also provided on the core 102. Winding 110 is closely coupled to winding 104 and winding 112 is closely coupled to winding 106. In addition to these windings the magnetometer 100 of FIG. 11 also includes a second set of secondary windings comprised of windings 114 and 116 which are respectively closely coupled to the windings 104 and 106. The polarity dots illustrated indicate the winding senses of each of the magnetometer windings.

The output of the first set of secondary windings 110 and 112 is connected to the base of a transistor-amplifier 120. The emitter of transistor 120 is connected through a parallel circuit comprised of resistor 122 and capacitor 124 to a source of positive potential (not shown). The emitter of transistor 120 is also connected to a threshold circuit 126 which controls the potential thereon. The collector of transistor 120 is connected through resistor 128 to a source of reference potential, such as ground.

When the heading of the navigable body carrying the apparatus of FIG. 11 deviates from the intended course, an error signal will be provided to the base of transistor 120. If the magnitude of the error signal is sufficient (as determined by the output of threshold circuit 126) transistor 120 will conduct thus providing a positive signal on its collector. The collector of transistor 120 is connected to the emitters of transistors 130 and 132. The collector of transistor 130 is connected through a feedback path 134 to the first set of secondary windings including windings 110 and 112. The collector of transistor 132 is connected through feedback path 136 to the secondary windings 114 and 116. The bases of the transistor switches 130 and 132 are respectively connected to first and second output terminals of a multivibrator 138.

The multivibrator 138 alternately forward biases the transistors 130 and 132 to thus effectively alternately couple the collector of transistor amplifier 120 to the feedback paths 134 and 136. When a direction error is sensed, the output from the magnetometer 100 will cause the transistor amplifier 120 to conduct to thus alternately feed back current to the first and second sets of megnetometer secondary windings through transistors 130 and 132. Since the windings 110 and 112 are wound oppositely with respect to the windings 114 and 116, the feedback currents from transistors 130 and 132 will tend to create oppositely directed auxiliary magnetic fields. Thus for an error in a first direction, feedback current from transistor 130 will have an additive effect to thus increase the current to transistor 130 and cause regeneration in the loop including the magnetometer and transistors 120 and 130. The feedback current from transistor switch 132 will oppose an error in the first direction to thus substantially reduce to zero the current through transistor 132. For an error in the opposite direction, regeneration will occur in the loop including transistor 132 and degeneration in the loop including transistor 130.

Relay winding 140, corresponding to relay winding 56 of FIG. 6, is connected between the collector of transistor 130 and ground. Similarly, relay winding 142 corresponding to relay winding 65 of FIG. 6 is connected between the collector of transistor 132 and ground. Relay windings 140 and 142 respectively control normally open switches 144 and 146 which are each coupled to a rudder servo control device 148 identical to the rudder servo control 50 of FIG. 6. The rudder servo control 148 of FIG. 11 controls a rudder position assembly 150 adapted to move the rudder as aforedescribed.

Whereas the rudder position feedback circuitry of FIG. 6 included a potentiometer connected between two fixed potential levels, in accordance with the embodiment of FIG. 11, a system is provided for varying the rudder feedback ratio as a function of the speed of the body. More particularly, the embodiment of FIG. 11 includes a potentiometer 152 including a wiper arm 154 secured to the rudder (not shown). The potentiometer 152 is connected between a source of reference potential such as ground and the emitter of a transistor 156. The collector of the transistor 156 is connected to a source of positive potential and the base thereof is connected to a wiper arm 158 cooperating with a potentiometer 160 connected between a source of positive potential and a reference potential such as ground. The position of the wiper arm 158 is determined by the speed of the body. Connected in parallel with the potentiometer 152 is a pair of serially connected resistors 162 and 164. The potential on the emitter of transistor 156 is determined by the position of the wiper arm 158 on the potentiometer 160.

The rudder feedback winding 156, corresponding to the windings 52A and 58A of FIG. 6 is connected in series with a variable resistor 168 between the wiper arm 154 and the junction defined between resistors 162 and 164. Accordingly, the magnitude of feedback current supplied to the winding 166 is determined by both the speed of the body and the value of resistor 168 which is intended to be adjusted to be suitable for the turning characteristics of the body on which the system is employed.

Thus, in the operation of the embodiment of FIG. 11, in response to a directional error, one of the relay coils 140 and 142 will be energized to thus cause the rudder servo control 148 and rudder position assembly 150 to move the rudder to a position tending to correct the heading of the body. The positional information of the rudder is fed back to the winding 166 to avoid hunting as was previously discussed. For a constant speed, the amount of current fed through the winding 166 for a fixed position of the rudder is determined by the value of variable resistor 168. This ratio is important and depends upon the turning characteristics of the body employing the auto-pilot system. More particularly, if an excessively high feedback ratio is employed, the system will hunt, while if an excessively low ratio is utilized, course correction will be very sluggish. Inasmuch as turning characteristics can vary significantly, the provision of the variable resistor 168 enables the rudder feedback ratio to be optimized for the particular navigable body in which the system is installed. Because turning characteristics of each given body vary with speed however, due to the fact that the effectiveness of the rudder is a non-linear function of speed, the amount of current fed back to the winding 166 is controlled in accordance with the speed by the transistor 156. That is, as speed and rudder effectiveness increase, less current is required by the winding 166. Accordingly, the wiper arm 158 is moved down on the potentiometer 160 to thus reduce the potential on the emitter of transistor 156 to therefore reduce the potential between the wiper arm 154 and the junction defined between the resistors 162 and 164. Therefore, less current will flow through the winding 166. On the other hand, if speed is reduced, then the wiper arm 158 moves up on the potentiometer 160 so that a greater current will flow through the winding 166.

Figure 13:
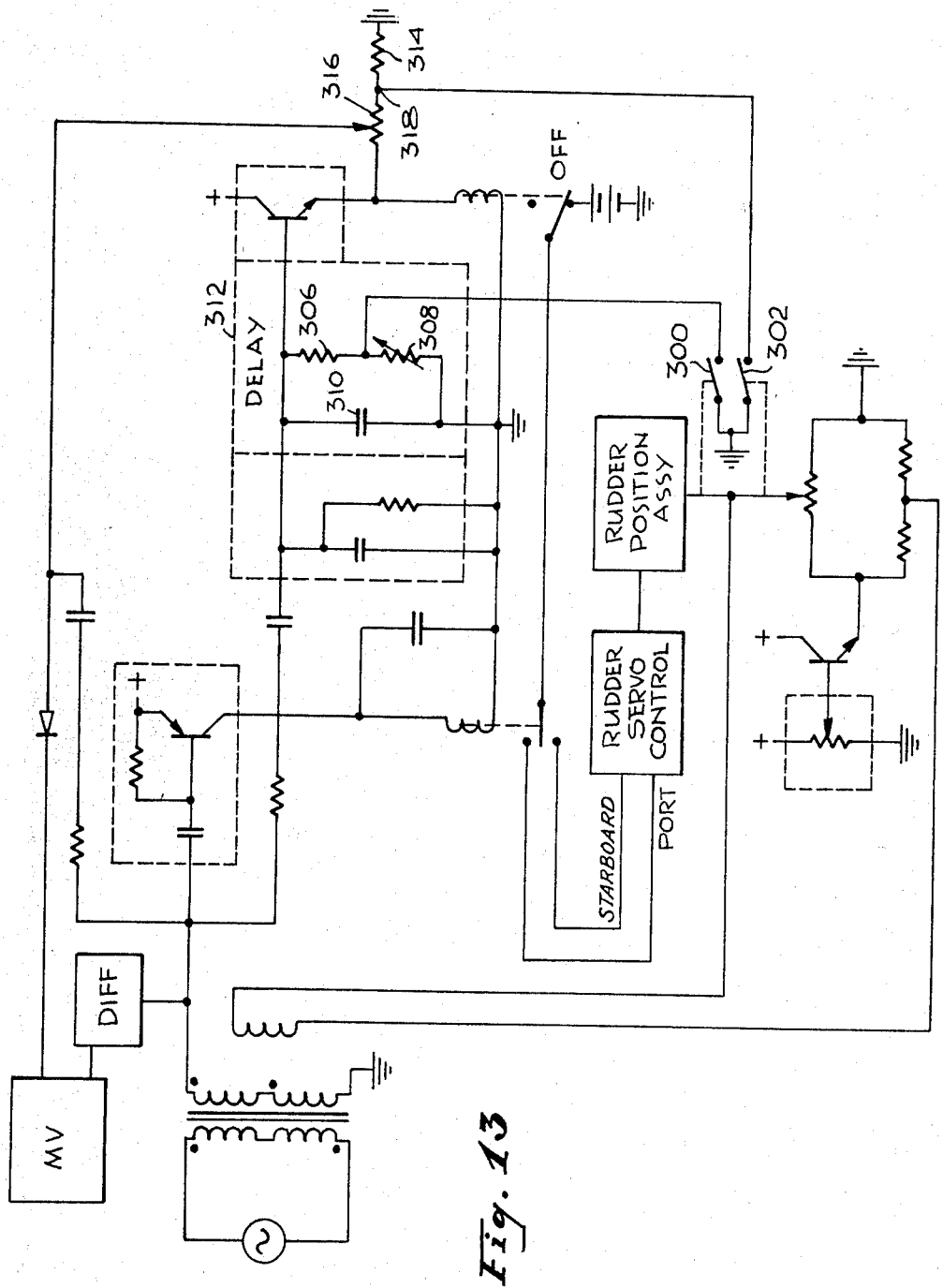
FIG. 13 is a schematic and block diagram of a fourth embodiment of the invention.

Attention is now called to the embodiment of FIG. 13 which employs a single magnetometer and an amplifier connected so that for a sufficient error in one direction, the amplifier-magnetometer loop will be degenerative and for a sufficient error in the opposite direction, the loop will be regenerative. In addition, the embodiment of FIG. 13 includes means for supplying an alternating jitter current to the secondary windings of the magnetometer which current has the effect of simulating the alternate swinging of the magnetometer through a threshold angle. If the body is substantially on course, the amplifier connected to the output of the magnetometer will alternately regenerate and degenerate at the jitter current frequency, thus providing an alternating output signal. If, however, the body is sufficiently off course, the amplifier-magnetometer loop will remain either regenerated or degenerated in spite of the effects of the jitter current. In this event, the rudder position assembly will be energized to move the rudder to correct the heading of the body.

Figure 12:
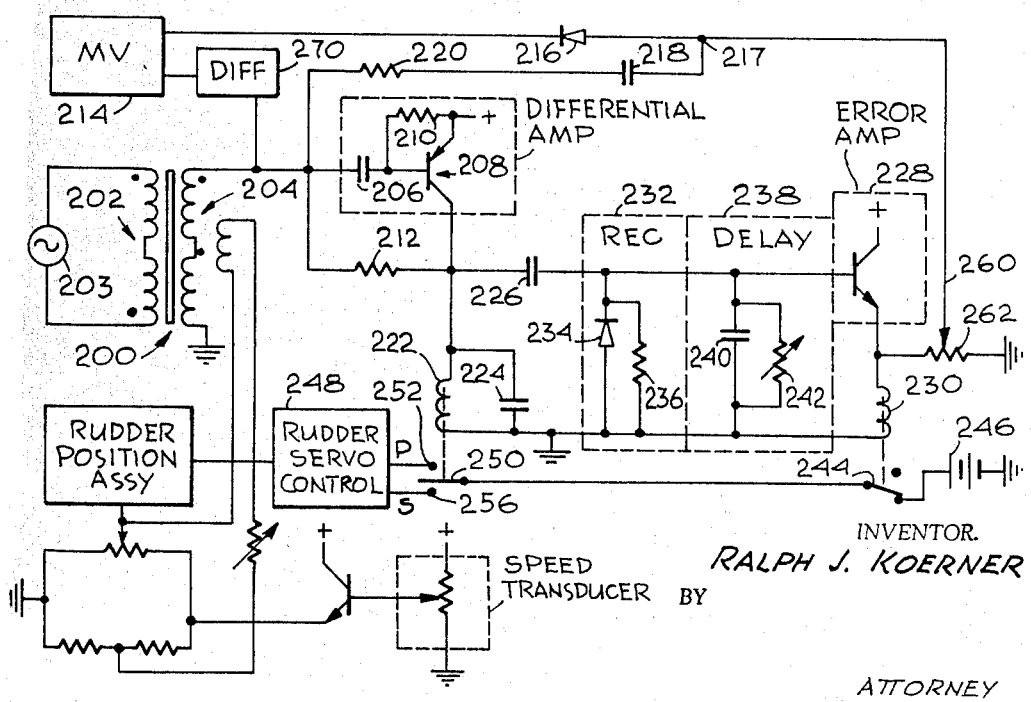
FIG. 12 is a schematic and block diagram of a third embodiment of the invention.

The embodiment of FIG. 12 includes a single magnetometer 200 which can be identical to one of the magnetometers described in detail in conjunction with FIG. 6. More particularly, the magnetometer 200 includes a set of primary windings 202, energized by oscillator 203 and a set of secondary windings 204, as previously discussed, provide an output signal in response to a horizontal component of the earth's magnetic field being sensed. The magnetometer secondary windings 204 are connected through a capacitor 206 to the base of a transistor amplifier 208. A resistor 210 is connected between the emitter and base of transistor 208. The emitter of transistor 208 is connected to a source of positive potential (not shown). Feedback resistor 212 connects the collector of transistor 208 to the magnetometer secondary windings 204. Thus in response to a sufficient error, the amplifier 208 will provide a feedback signal through the resistor 212 which will create an auxiliary field to either aid or oppose the sensed earth's magnetic field components to thus force the amplifier 208 into either degeneration or regeneration. If the directional error causes the magnetometer to sense a smaller field component than is provided by the jitter current, however, then the amplifier 208 will alternately regenerate and degenerate at the jitter current frequency.

In accordance with the embodiment of FIG. 12, an alternating jitter current is driven through the secondary windings 204 in order to simulate the alternate swinging of the magnetometer through a threshold angle, which angle depends upon the magnitude of the jitter current. The rate of the jitter current is controlled by a multivibrator 214 connected to the magnetometer through diode 216, capacitor 218 and resistor 220. The multivibrator 214 preferably provides a square wave output signal varying between ground and some positive potential and having a frequency which is much lower than that of oscillator 203. For example, oscillator 203 can have a frequency of 70 kilocycles per second and multivibrator 214 can have a frequency of 100 cycles per second. If the body is substantially on course so that there is no horizontal component of the earth's magnetic field extending along the long axis of the magnetometer, then the amplifier 208 will alternately degenerate and regenerate at the jitter current frequency. If, however, a substantial component of the earth's horizontal magnetic field exists along the long axis of the magnetometer, then the amplifier 208 will either be substantially saturated or cut off.

The collector of transistor 208 is connected through a relay coil 222 to a source of reference potential such as ground. Capacitor 224 is connected in parallel with relay coil 222. In addition, the collector of transistor 208 is connected through capacitor 226 to the base of a transistor amplifier 228. The collector of transistor 228 is connected to a source of positive potential and the emitter thereof is connected to ground through relay coil 230.

A rectifier circuit 232 comprised of a diode 234 and a resistor 236 is connected between the base of transistor 228 and ground. Additionally, a delay circuit 238 comprised of capacitor 240 and a variable resistor 242 is also connected between the base of transistor 228 and ground.

When the transistor 208 alternately regenerates and degenerates at the jitter current frequency, an alternating signal appears at the collector thereof which is coupled by capacitor 226 to the base of transistor 228. This alternating signal is rectified by the rectifier circuit 232 to hold the potential on the base of transistor 228 above that of its emitter to thus forward bias transistor 228. When transistor 228 is forward biased, relay coil 230 is energized.

A single pole double throw switch contact 244 is responsive to relay coil 230. When switch contact 244 is in the upper or energized position, battery 246 is disconnected from the rudder servo control 248. Thus, so long as transistor 208 provides an alternating output signal, transistor 228 will energize relay coil 230 to disable the rudder servo control 248 to thereby prevent movement of the rudder.

Assume now that the heading of the body deviates from the course and as a consequence the loop including magnetometer 200 and amplifier 208 is regenerative to thus energize relay coil 222. When relay coil 222 is energized, switch contact 250 is moved into engagement with fixed contact 252. In addition, the direct current potential on the collector of transistor 208 will be blocked by capacitor 226 from the base of transistor 228. Therefore, transistor 228 will be cut off to deenergize relay coil 230 and release movable contact 244 into engagement with fixed contact 254. Thus, battery 246 will be connected to the rudder servo control 248 through fixed contact 252 to thus initiate movement of the rudder to correct for a portside error.

Consider now an error in the opposite direction such that the amplifier 208 degenerates. Consequently, relay coil 222 will be deenergized and the movable contact 250 will engage fixed contact 256. Transistor 228 will be held off by the ground potential on the collector of transistor 208 thereby leaving relay coil 230 deenergized with relay contact 244 in engagement with fixed contact 254. Accordingly, battery 246 will be connected to the servo control 248 through fixed contact 256 to thus move the rudder to compensate for a starboard error.

The delay circuit 238 serves the function of maintaining the transistor 228 energized for a selected duration after an alternating current supplied by transistor 208 to the capacitor 226 ceases. That is, assume that the body is on course with the transistor 228 energized thereby disabling the servo control 248. Assume further that by some spurious wave action the body is momentarily pushed off course to force the amplifier 208 into either regeneration or degeneration for a short period, say two seconds. In order to prevent this action from immediately cutting transistor 228 off, the delay circuit 238 is provided to introduce a delay e.g. five seconds to thus prevent transistor 228 from being cut off unless the off-course condition persists. When the body is in an on-course condition with the transistor 228 conducting, a potential will be built up across capacitor 240 which potential will maintain transistor 228 in conduction for a period which is determined by the time constant of the delay circuit 238 which time constant of course is dependent upon the values of the capacitor 240 and resistor 242. Resistor 242 is variable to enable the duration to be chosen on the basis of sea conditions, for example.

As previously discussed, the magnitude of the jitter current provided to the magnetometer secondary winding determines the threshold angle. For example, utilizing a very small current the system can be made to respond to a heading error of less than one degree. By increasing the magnitude of the jitter current, the threshold can be increased to any desired level. The magnitude of the jitter current is determined by the position of wiper arm 260 on potentiometer 262. Potentiometer 262 is connected between the emitter of transistor 228 and a source of reference potential such as ground. When the body is on course and transistor 228 is conducting, the left side of potentiometer 262 will be at a high potential. It will be recalled that the multivibrator 214 has been indicated as providing a square wave signal which varies between ground and some positive potential. During the half cycles when the multivibrator output is at ground, the junction 217 between the diode 216 and the capacitor 218 will be at ground. During the half cycles when the cathode of diode 216 is at some positive potential level, the diode will be backbiased and the potential at junction 217 will be determined by the potential on the wiper arm 260. Accordingly, when the body is on course with the transistor 228 conducting and a high potential on the emitter thereof, the voltage excursions at the junction point 217 will be greater than when the body is off course with the transistor 228 cut off and the emitter thereof substantially at ground potential. It should therefore be apparent that when the body is on course a relatively large threshold angle can be established in order to prevent correction of what may be small and isolated errors. On the other hand, once an off course condition is detected, then the threshold angle is reduced to near zero to permit exact correction to the course.

In order to prevent the transistor 208 from blocking up in a regenerative condition, it is periodically reset by applying a positive potential spike to the base thereof from differentiator circuit 270 which is responsive to multivibrator 214.

The rudder servo control 248 controls a rudder position assembly for moving the rudder and providing a feedback signal to the secondary windings of the magnetometer in the manner described in FIG. 11.

Summarizing, in accordance with the embodiment of FIG. 12, delay means have been provided for introducing a variable delay to prevent the auto-pilot system from responding immediately to an error condition. Rather, no rudder movement is effected for the duration of the delay which is determined by the time constant of the delay circuit 238. Also, a variable threshold means is provided which enables any desired threshold angle to be defined by adjustment of wiper arm 260. Moreover, the embodiment of FIG. 12 automatically reduces the threshold angle to substantially zero once an error of a magnitude sufficient to require correction is sensed.

Although the incorporation of the delay means in the embodiment of FIG. 12 is extremely useful in order to permit spurious errors to be ignored, it has been found desirable to delete the delay once the rudder has been moved from a dead ahead position to a correcting position. That is, it will be recalled that once an error is recognized, the rudder is repositioned to change the heading of the body to correct the error. As the heading of the body is incrementally corrected, the rudder is incrementally moved back toward a dead ahead position. During this correction period between the initial positioning of the rubber and until it returns to the dead ahead position, it is desirable that the delay be deleted in order to enable the body to be set back on course as quickly as possible. Also, throughout this correction period it is desirable to maintain a very small threshold angle. The embodiment of FIG. 13 incorporates means for sensing when the rudder is not in a dead ahead position and for reducing the delay and threshold angle to substantially zero under these circumstances.

More particularly, the embodiment of FIG. 13 includes first and second switches 300 and 302 which are mechanically coupled to the rudder by means not shown. Suffice it to say that when the rudder is in a dead ahead position, the switches 300 and 302 are open and when the rudder is off center, the switches are closed. Switch 300 is connected between ground and junction point 304 defined between fixed resistor 306 and variable resistor 308. Resistors 306 and 308 are connected in series with each other and in parallel with capacitor 310. This parallel circuit comprises a delay circuit 312 and corresponds to the delay circuit 238 of FIG. 12. It should be apparent that when switch 300 is open, the capacitor 310 must discharge through the series resistance comprised of resistors 306 and 308. However, when the rudder is off center and the switch 300 is closed, the capacitor 310 need discharge only through resistor 306 thereby reducing the discharge time and thus the delay introduced by circuit 312.

In the embodiment of FIG. 13, a resistor 314 is connected in series with potentiometer 316 corresponding to potentiometer 262 of the embodiment of FIG. 12. Junction point 318 defined between potentiometer 316 and resistor 314 is connected to ground through switch 302. Thus, when the rudder is off center and switch 302 is closed, junction point 318 is grounded which of course has the effect of considerably reducing the magnitude of the jitter current which would otherwise be applied to the magnetometer. Reduction of the jitter current magnitude, of course, proportionately reduces the threshold angle.

Thus, it should be appreciated that the embodiment of the invention illustrated in FIG. 13 is very similar to that illustrated in FIG. 12 except, however, that during a correction period as represented by the rudder being off center, the delay and threshold angle are reduced to substantially zero to cause the system to react very quickly and precisely to reposition the body to an on-course condition.

From the foregoing, it should be appreciated that several different embodiments of the present invention have been disclosed, each embodiment being responsive to the directional deviation of a body from a predetermined course for automatically returning the body to that course. Directional deviations are sensed by a magnetic field sensing means which in turn supplies signals to a rudder controlling servo system which moves the rudder as a function of the degree of directional deviation. In addition, as the rudder turns in response to its controlling signals, electrical feedback signals are supplied to the magnetic field sensing means to limit the rudder movement to an angle necessary to return the body to the desired course. As the body responds to the rudder's new position, the rudder is gradually returned to a dead ahead position to thus avoid hunting effects previously discussed.

It should be apparent that the present invention provides an auto-pilot system which is not limited to marine navigable bodies, but which may be adapted to bodies navigable in other mediums, and it is therefore intended that the invention not be limited by the specific embodiments shown or described. Further, it is recognized that various changes may be made in the details of the embodiments illustrated by those skilled in the art without departing from the true spirit and scope of the invention.

The embodiments of the invention in which an exclusive property or privilege is claimed are defined as follows:

1. In combination with a ship having a rudder adapted for variably turning in first and second opposite directions from a quiescent position, an auto-pilot system including means for defining a course of travel of said ship with respect to a unidirectional ambient magnetic field and for turning said rudder by an amount proportional to deviation of the ship's heading from said defined course of travel and in a direction to tend to rotate said ship and align the heading thereof with said defined course, said auto-pilot system including:

magnetic field sensing means for sensing said unidirectional ambient magnetic field and producing first signals whose characteristics are a function of the degree and direction of angular deviation of said magnetic field sensing means from a quiescent predetermined orientation with respect to the direction of said ambient magnetic field;

means for mounting said magnetic field sensing means on said ship to be substantially aligned in said quiescent predetermined orientation with respect to the direction of said ambient magnetic field when the heading of said ship is aligned with said defined course of travel so that said first signals are substantially equal to zero;

feedback means responsive to the position of said rudder in said first and second opposite directions from said quiescent position for providing rudder position feedback signals whose characteristics are related to the positions of said rudder; and means responsive to said first signals and said rudder position feedback signals for providing output signals whose characteristics are a function of both the deviation of said ship's heading from said defined course of travel and the rudder position for turning said rudder from said quiescent position in response thereto;

said magnetic field sensing means comprising first and second magnetometers;

said unidirectional ambient magnetic field comprising the earth's ambient horizontal magnetic field;

said quiescent predetermined orientation comprising an east-west orientation with respect to the magnetic north;

each of said first and second magnetometers including a saturable magnetic core having a longitudinal axis, a pair of oppositely wound input windings wound about said core, a pair of like wound output windings wound about said core, and a feedback winding wound about said core;

said first and second magnetometers having their longitudinal axes of their magnetic cores aligned in said east-west orientation when said ship is aligned with said defined course of travel.

2. The system defined by claim 1 wherein said first and second signals are produced in the saturable magnetic cores of said first and second magnetometers as functions of the degrees of angular deviations of the longitudinal axes of the magnetic cores of said first and second magnetometers from said east-west direction with respect to the earth's magnetic north.

3. The system defined by claim 2 wherein said feedback means further includes means for energizing the feedback windings wound about the magnetic cores of said first and second magnetometers so that said first and second signals in the pairs of like-wound output windings of said first and second magnetometers, respectively, are functions of the first and second signals produced in said magnetic cores of said first and second magnetometers and the magnetic fields detected by said magnetic cores as a function of said rudder position feedback signals in said feedback windings of said first and second magnetometers.

4. In combination with a ship having a rudder mounted for variable angular movement in first and second opposite directions, an autopilot system including means for defining a course with respect to a unidirectional ambient magnetic field and for turning said rudder through an angle proportional to the angular deviation between the ship's heading and said defined course and in a direction to tend to rotate the ship to align said heading with said defined course, said autopilot system including:

device means mounted on said ship for sensing said unidirectional ambient magnetic field and for providing first and second output signal variations in response to opposite angular deviations of said device means from a predetermined orientation with respect to the direction of said ambient magnetic field, the amplitudes of said output signal variations being related to the degree of such angular deviations;

means fixing the orientation of said device means with respect to said ship to align said device means with said predetermined orientation for establishing quiescent values of said output signals when the heading of said ship is aligned with said course;

feedback means responsive to the angular deviations of said rudder in first and second directions from a quiescent position for respectively providing first and second rudder position signals, the amplitudes of said rudder position signals being related to the degree of said angular deviations including means for energizing said device means with said first and second rudder position signals;

circuit means for summing said first output signal variation in opposition with said first rudder position signal and said second output signal variation in opposition with said second rudder position signal to thereby effectively develop first and second steering command signals; and means responsive to said first and second steering command signals for turning said rudder in first and second directions from said quiescent position.

5. The apparatus of claim 4 wherein the amplitudes of said rudder position signals are directly proportional to the degree of rudder angular deviation and wherein said feedback means includes a manually actuatable means for varying the proportionality between said rudder position signal amplitude and said degree of rudder angular deviation.

6. The system defined by claim 5 wherein said device means comprise first and second magnetometers, said unidirectional ambient magnetic field is the earth's ambient horizontal magnetic field, and said predetermined orientation is the east-west orientation with respect to the magnetic north.

7. The system defined by claim 6 wherein each of said first and second magnetometers comprises:

a saturable magnetic core having a longitudinal axis;
a pair of oppositely-wound input windings wound about said core;
a pair of like-wound output windings wound about said core; and
a feedback winding wound about said core, the longitudinal axes of the saturable magnetic cores of said first and second magnetometers being aligned with said east-west direction when said ship is aligned with said defined course of travel.

8. A system for detecting directional deviations of navigable means from a predetermined direction of travel and automatically piloting said means to said direction of travel comprising:

first and second magnetic field sensing means carried by said navigable means for detecting components of the earth's ambient horizontal magnetic field, the amplitudes of detected components being proportional to the degree of directional deviation of said navigable means from said predetermined direction of travel, said first and second magnetic field sensing means respectively providing first and second output signals;

first and second amplifying means respectively coupled to said first and second magnetic field sensing means for amplifying said first and second output signals to provide first and second amplified signals, respectively;

means connected to said first and second amplifying means for feeding back at least a portion of said first and second amplified signals to said first and second magnetic field sensing means, respectively, for causing said first magnetic field sensing means and said first amplifying means to become regenerative when the directional deviation of said navigable means from said predetermined direction of travel is in one direction, and for causing said second magnetic field sensing means and said second amplifying means to become regenerative when said directional deviation is in a direction opposite to said one direction, said first magnetic field sensing means and said first amplifying means being degenerative when said second magnetic field sensing means and said second amplifying means are regenerative, and said second magnetic field sensing means and said second amplifying means being degenerative when said first magnetic field sensing means and said first amplifying means are regenerative; and means including rudder control means coupled to said amplifying means and responsive to the amplified output signals thereof for controlling the position of the rudder of said body so as to control the direction of travel thereof as a function of at least the degree of directional deviation of said body from said predetermined direction, said control means further being coupled to said magnetic field sensing means and supplying an electrical feedback signal thereto so that said first and second output signals of said first and second magnetic field sensing means are functions of said degree of directional deviation of said body from said predetermined direction and said electrical feedback signal which is indicative of the rudder position.

9. A system for detecting directional deviations of navigable means from a predetermined direction of travel and automatically piloting said means to said direction of travel comprising:

first and second magnetic field sensing means carried by said navigable means for detecting components of the earth's ambient horizontal magnetic field, the amplitudes of detected components being proportional to the degree of directional deviation of said navigable means from said predetermined direction of travel, said first and second magnetic field sensing means respectively providing first and second output signals whose amplitudes are proportional to the amplitudes of said detected components of the earth's ambient horizontal magnetic field;

first and second amplifying means respectively coupled to said first and second magnetic field sensing means for amplifying said first and second output signals to provide first and second amplified signals, respectively;

means connected to said first and second amplifying means for feeding back at least a portion of said first and second amplified signals to said first and second magnetic field sensing means, respectively, for causing said first magnetic field sensing means and said first amplifying means to become regenerative when the directional deviation of said navigable means from said predetermined direction of travel is in one direction and for causing said second magnetic field sensing means and said second amplifying means to become regenerative when said directional deviation is in a direction opposite to said one direction, said first magnetic field sensing means and said first amplifying means being degenerative when said second magnetic field sensing means and said second amplifying means are regenerative, and said second magnetic field sensing means and said second amplifying means being degenerative when said first magnetic field sensing means and said first amplifying means are regenerative;

servo means coupled to said first and second amplifying means and energized by said first and second amplified signals for producing first and second servo control signals, respectively; and control means including rudder means for controlling the heading of said navigable means coupled to said servo means and energized by said first and second servo control signals for controlling the position of said rudder means in first and second directions, said control means further including rudder position feedback means for supplying first and second electrical feedback signals whose amplitudes and polarities are functions of the position of said rudder means in said first and second directions so that the apparent first and second output signals of said first and second magnetic field sensing means are below levels necessary for said first and second output signals to energize said first and second amplifying means so as to be amplified therein.

10. The system defined by claim 9 further comprising: adjustable threshold means coupled to said first and second amplifying means for determining said levels below which said first and second output signals do not energize said first and second amplifying means, respectively.

11. A system for detecting directional deviations of navigable means from a predetermined direction of travel and automatically piloting said means to said direction of travel comprising:

first and second magnetic field sensing means carried by said navigable means for detecting components of the earth's ambient horizontal magnetic field, the amplitudes of detected components being proportional to the degree of directional deviation of said navigable means from said predetermined direction of travel, said first and second magnetic field sensing means respectively providing first and second output signals whose amplitudes are at least related to the amplitudes of said detected components of the earth's ambient horizontal magnetic field;

first and second amplifying means respectively coupled to said first and second magnetic field sensing means for amplifying said first and second output signals to provide first and second amplified signals, respectively;

adjustable threshold means coupled to said first and second amplifying means for determining a minimum amplitude of output signal of said magnetic field sensing means necessary to energize said first and second amplifying means;

means connected to said first and second amplifying means for feeding back at least a portion of said first and second amplified signals to said first and second magnetic field sensing means, respectively, for causing said first magnetic field sensing means and said first amplifying means to become regenerative when the directional deviation of said navigable means from said predetermined direction of travel is in one direction and for causing said second magnetic field sensing means and said second amplifying means to become regenerative when said directional deviation is in a direction opposite to said one direction, said first magnetic field sensing means and said first amplifying means being degenerative when said second magnetic field sensing means and said second amplifying means are regenerative, and said second magnetic field sensing means and said second amplifying means being degenerative when said first magnetic field sensing means and said first amplifying means are regenerative;

servo means coupled to said first and second amplifying means and energized by said first and second amplified signals for producing first and second servo control signals, respectively;

rudder means coupled to said servo means and energized by said first and second servo control signals for controlling the position of said rudder means in first and second directions, thereby controlling the heading of said navigable means; and rudder position feedback means coupled to said rudder means and responsive to the position of said rudder means in said first and second directions for producing first and second feedback signals which are functions of the position of said rudder means in said first and second directions, said first and second feedback signals being supplied to said first and second magnetic field sensing means to be combined therein with the detected components of the earth's ambient horizontal magnetic field, so that said first and second output signals of said first and second magnetic field sensing means are functions of both said degree of directional deviation of said navigable means from said predetermined direction of travel, and the position of said rudder.

12. The system defined by claim 11 wherein said first and second magnetic field sensing means comprise two magnetometers.

13. A system for piloting a ship to head in a desired course by automatically controlling the position of the rudder thereof with respect to a quiescent position, comprising:

magnetometer means mountable on said ship to detect components of the earth's horizontal magnetic field only when said ship deviates from said desired course and for producing signals as a function of both the magnitude and direction of deviation from said course;

threshold means;

first and second amplifying means coupled to said magnetometer means and said threshold means so as to operate in a regenerative-degenerative mode whereby said first amplifying means produce a first command signal and said second amplifying means are cut off whenever said ship deviates from said desired course in a first direction by an amount exceeding a threshold level controlled by said threshold means, and said second amplifying means produce a second command signal and said first amplifying means are cut off whenever said ship deviates from said desired course in a second direction by an amount exceeding said threshold level;

means responsive to said first and second command signals for automatically controlling the position of said rudder in first and second directions respectively with respect to said quiescent position so as to pilot said ship to head in said desired course; and means responsive to the position of said rudder for producing a related signal fed back to said magnetometer means so as to control the signals produced therein to be a function of the rudder position, as well as the detected components of the earth's horizontal magnetic field.

14. The system as recited in claim 13 further including means for controlling the relative characteristics of the signal produced in response to the position of said rudder so as to vary the amplitude of the signal fed back to said magnetometer means for a given rudder position.

15. A system for piloting a body to head along a desired course by moving the position of a steering mechanism, said system including:

a magnetic field sensing means defining an axis and mountable on said body for detecting magnetic field components in first and second directions along said axis and for producing an output signal as a function of the resultant magnitude of said detected magnetic field components;

a first amplifying means;

means applying said output signal to said first amplifying means;

feedback means responsive to said first amplifying means for creating a first auxiliary magnetic field component along said axis in a first direction to thus increase the resultant magnitude of magnetic field components detected by said magnetic field sensing means if in the absence of said first auxiliary field component said detected field componets are in said first direction and to decrease the resultant magnitude of magnetic field components detected by said magnetic field sensing means if in the absence of said first auxiliary field component said detected field components are in said second direction whereby said first amplifying means is driven to a first state when said resultant magnitude is increased and to a second state when said resultant magnitude is decreased; and means responsive to the state defined by said first amplifying means for moving the position of said steering mechanism in a direction to hold said body along said desired course.

16. The system of claim 15 including:
a second amplifying means; and
means for driving said second amplifying means to first and second states respectively coincident with said first amplifying means being driven to second and first states; and wherein
said means for moving said steering mechanism includes means for moving said steering mechanism in a first direction when said first amplifying means defines a first state and means for moving said steering mechanism in a second direction when said second amplifying means defines a first state.

17. The system of claim 16 including feedback means responsive to said second amplifying means for creating a second auxiliary magnetic field component along said axis in a second direction to thus increase the resultant magnitude of magnetic field components detected by said magnetic field sensing means if in the absence of said second auxiliary field component said detected field components are in said second direction and to decrease the resultant magnitude of magnetic field components detected by said magnetic field sensing means if in the absence of said second auxiliary field component said detected field components are in said first direction.

18. The system of claim 17 including means for alternately activating said first and second feedback means.

19. The system of claim 15 including means for producing a steering feedback magnetic field component along said axis related to the position of said steering mechanism.

20. The system of claim 19 including means for selectively varying the relationship between the magnitude of said steering feedback field component and the position of said steering mechanism.

21. The system of claim 19 including:
means for determining the speed of said body; and
means responsive to said speed determining means for varying the relationship between the magnitude of said steering feedback field component and the position of said steering mechanism.

22. The system of claim 15 including:
means for alternately creating, at a fixed rate, magnetic field components along said axis in said first and second directions; and
means responsive to said first amplifying means alternately defining said first and second states at said fixed rate for preventing movement of said steering mechanism.

23. The system of claim 22 including means for selectively establishing the magnitude of said alternately created magnetic field components.

24. The system of claim 23 including means for reducing the established magnitude of said alternately created magnetic field components whenever said first amplifying means does not alternately define said first and second states at said fixed rate.

25. A system for piloting a ship to head in a desired course by automatically controlling the position of the rudder thereof with respect to a quiescent position comprising:
magnetic field sensing means defining an axis for detecting magnetic field components in first and second opposite directions along said axis and for producing an output signal as a function of the resultant magnitude of said detected components;
means mounting said sensing means on said ship to detect a component of the earth's horizontal magnetic field only when said ship deviates from said desired course;
an amplifier means responsive to said output signal;
feedback means responsive to said amplifier means for creating a magnetic field component along said axis in said first direction to either aid or oppose said detected component of the earth's horizontal magnetic field depending on the direction thereof to thus respectively drive said amplifier means into first and second states;
jitter source means for alternately creating at a fixed frequency magnetic field components along said axis in said first and second directions tending to alternately drive said amplifier means at said fixed frequency into said first and second states; and
means responsive to said amplifier means alternately defining said first and second states at said fixed frequency for preventing movement of said rudder.

26. A system for piloting a ship to head in a desired course by automatically controlling the position of the rudder thereof with respect to a quiescent position comprising:
magnetic field sensing means defining an axis for detecting magnetic field components in first and second opposite directions along said axis and for producing an output signal as a function of the resultant magnitude of said detected components;
means mounting said sensing means on said ship to detect a component of the earth's horizontal magnetic field only when said ship deviates from said desired course;
an amplifier means responsive to said output signal;
feedback means responsive to said amplifier means for creating a magnetic field component along said axis in said first direction to either aid or oppose said detected component of the earth's horizontal magnetic field depending on the direction thereof to thus respectively drive said amplifier means into first and second states;
jitter source means for alternately creating magnetic field components for fixed time periods along said axis in said first and second directions, thus tending to alternately drive said amplifier means into said first and second states;
first means responsive to said amplifier means defining said first state for substantially longer than said fixed time period for moving said rudder in a first direction from said quiescent position; and
second means responsive to said amplifier means defining said second state for substantially longer than said fixed time period for moving said rudder in a second direction from said quiescent position.

27. The system of claim 26 including means for selectively varying the magnitude of said magnetic field components created by said jitter source means.

28. The system of claim 26 including means for reducing the magnitude of said magnetic field components created by said jitter source means to substantially zero in response to said amplifier means defining said first or second states for substantially longer than said fixed time period.

29. The system of claim 26 including means responsive to said rudder not being positioned at said quiescent position for reducing the magnitude of said magnetic field components created by said jitter source means to substantially zero.

30. The system of claim 26 including a variable delay means for delaying the responsiveness of said first and second means by a selected delay period.

31. The system of claim 30 including means responsive to said rudder not being positioned at said quiescent position for reducing said delay period to substantially zero.

32. The system of claim 26 including means responsive to said amplifier means alternately defining said first and second states for said fixed time periods for preventing movement of said rudder.

33. The system of claim 26 wherein said magnetic field sensing means comprises a magnetometer including a set of secondary windings; and wherein said feedback means and said jitter source means each provide current to said secondary windings for respectively creating said magnetic field components.

34. The system of claim 26 including means responsive to the position of said rudder for creating a magnetic field component along said axis related thereto.

35. The system of claim 34 including means for selectively varying the relationship between the position of said rudder and said magnetic field component related thereto.

36. The system of claim 34 including means responsive to the speed of said ship for varying the relationship between the position of said rudder and said magnetic field component related thereto.

References Cited by the Examiner
UNITED STATES PATENTS

| | | | |
|---|---|---|---|
| 2,403,669 | 7/1946 | Martin et al. | 33—204 |
| 3,040,748 | 6/1962 | Geyger | 324—43 |
| 3,129,686 | 4/1964 | Sakson | 114—144 |
| 3,167,698 | 1/1965 | Gray et al. | 318—489 X |

MILTON BUCHLER, *Primary Examiner.*

ANDREW H. FARRELL, *Examiner.*